May 1, 1923.
E. F. ANDREWS
HYDROMETER
Filed June 24, 1918     2 Sheets-Sheet 1
1,453,488
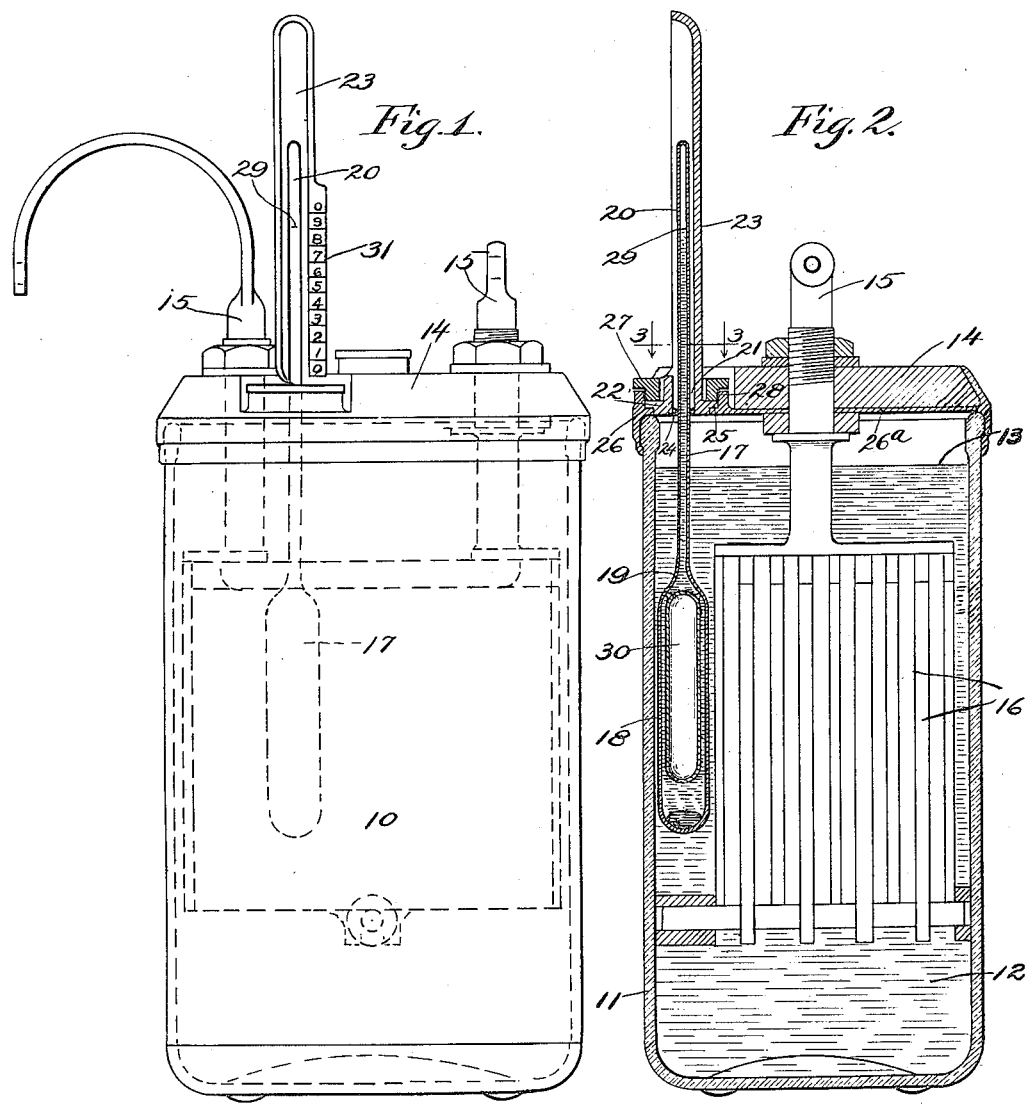
INVENTOR
Edward F. Andrews
BY
Sheridan Jones, Sheridan & Smith  ATTORNEYS May 1, 1923.

E. F. ANDREWS

HYDROMETER

Filed June 24, 1918    2 Sheets-Sheet 2

1,453,488

INVENTOR:
Edward F. Andrews
BY
Sheridan, Jones, Sheridan and Smith, ATTORNEYS

Patented May 1, 1923.

1,453,488

UNITED STATES PATENT OFFICE.

EDWARD F. ANDREWS, OF MAYWOOD, ILLINOIS.

HYDROMETER.

Application filed June 24, 1918. Serial No. 241,532.

*To all whom it may concern:*

Be it known that I, EDWARD F. ANDREWS, a citizen of the United States, residing at Maywood, in the county of Cook and State of Illinois, have invented certain new and useful Improvements in Hydrometers, of which the following is a specification.

This invention relates to improvements in hydrometers and more particularly to hydrometers of the type adapted for use in connection with storage batteries.

It is well known that the specific gravity of the electrolyte of a storage battery varies with changes in temperature and that in using ordinary hydrometers of the type now commonly used it is necessary, in taking readings at a temperature other than the temperature at which the hydrometer was calibrated, to make corrections allowing for the difference in temperature and the change in specific gravity of the electrolyte caused thereby before the condition of charge of the battery can be accurately determined.

One object of the present invention is to provide a hydrometer which shall be provided with means adapted to automatically compensate for temperature changes in such wise that the condition of charge of a storage battery may be readily, quickly and accurately determined from a reading of the hydrometer without making any subsequent corrections for the changes in temperature.

Another object resides in the provision of a compensating hydrometer which shall be readable against an adjacent scale which is designed to project above the battery, thereby overcoming the inconveniences and disadvantages attendant upon the taking of a reading with hydrometers of the type which are read against the level of the electrolyte, the specific gravity of which it is desired to determine.

A further object of the invention is to provide a hydrometer primarily adapted for use with storage batteries which shall be provided with temperature responsive means adapted to be read in conjunction with an adjacent scale, the indicating portion of said means undergoing a change in position relative to said scale each time there is a change in specific gravity occasioned by a change in the condition of charge of the battery, said indicating portion, however, remaining approximately fixed relative to said scale upon changes in specific gravity occasioned by variations in temperature only, whereby a reading of said hydrometer will indicate the exact condition of charge of the battery without any subsequent corrections for temperature being necessary.

Other objects and advantages will be apparent from the following description taken in connection with the accompanying drawings wherein several embodiments of the invention are illustrated.

Fig. 1 is a side elevation of a storage cell showing the hydrometer mounted in position;

Fig. 2 is a vertical cross-sectional view of a storage cell showing the construction of the hydrometer and its cooperating scale more in detail;

Fig. 3 is a sectional view taken on line 3—3 of Fig. 2;

Figure 4:
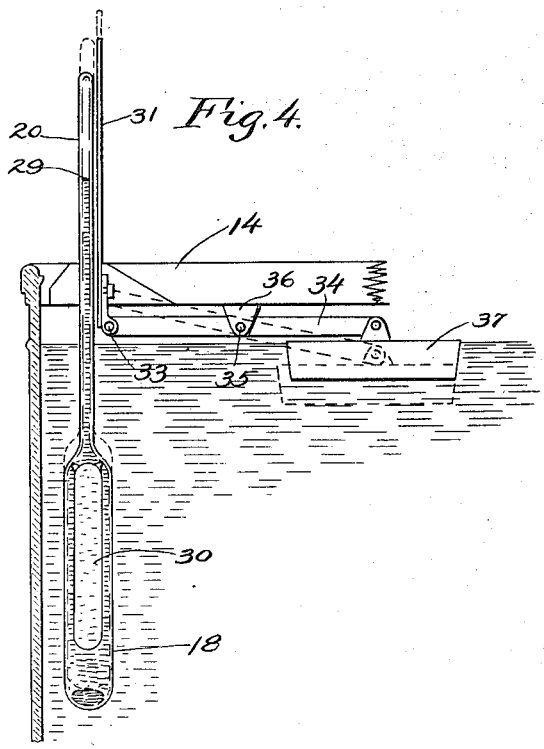
Fig. 4 is a fragmentary sectional view taken through a storage cell illustrating a slightly modified form of the invention.

Referring more in detail to the drawings, 10 designates one of the cells of a storage battery, which cell comprises the usual vessel 11 adapted to contain the electrolyte 12, the normal level of which is designated as 13. The vessel is provided with a cover 14, which cover is to form the subject matter of a separate application. Suspended in any preferred manner within the electrolyte 12 by their terminals 15 are the usual plates 16, said plates in the present instance being positioned slightly to one side of the vessel 11 in order to provide sufficient space for the hydrometer 17, which is designed to float in the electrolyte between said plates and the adjacent wall of the vessel as shown more clearly in Fig. 2.

The hydrometer, which forms the subject matter of the present invention, comprises an enlarged lower portion 18 which is narrowed at the point 19 and which extends upwardly from said point in the shape of an elongated cylindrical tube 20 of comparatively small diameter, said tube being designed to extend through a suitable opening 21 provided in the base 22 of a protector 23. The protector is preferably in the form of a semi-cylindrical tubular member which houses the tube 20 and protects the same against injury. Projecting inwardly from the walls of the opening 21 near the lower end thereof are a plurality of lugs 24 which are designed to bear against the tube 20 of the hydrometer, thereby maintaining the same centrally disposed within said opening during its movements relative thereto as occasioned by the changes in the specific gravity of the electrolyte. These lugs not only maintain the tube in its proper central position with respect to the protecting tube 23, but also serve to prevent said tube from adhering to the sides of the opening 21 and thereby interfering with the accuracy of the hydrometer readings.

The base 22 of the protecting tube 23 is provided with an annular flange 25 which is positioned to support said tube on the cover 14 of the cell by engagement with the annular seat 26 of the supporting plate 26ª of said cover. After the tube 23 has thus been mounted in position on the seat 26, the same is firmly clamped in such position by means of the nut 27 which screw-threadedly engages the side walls of the opening 28 provided in the plate 26ª for receiving the hydrometer and its protecting tube. The base of the nut 27, as will be noted from the drawings, is designed to bear firmly down upon the upper surface of the annular flange 25 which is preferably integral with the base 22 of the tube 23. In this manner, the tube 23 is securely held in its upright position and maintained against accidental displacement. The tube 23, nut 27 and the plate 26ª of the cover are all preferably cast of lead or some suitable alloy thereof, in order that said parts may not be deteriorated by the action of the electrolyte thereon.

A sufficient quantity of liquid which responds quickly to temperature changes is placed in the hydrometer, so that the normal level 29 thereof will project at all times a suitable distance above the cover 14 of the cell to render it readily visible from the exterior of the cell. Ether has been found very desirable for this purpose by reason of its lightness and further by reason of its comparatively high co-efficient of expansion. It will be readily appreciated, however, that any other suitable liquid may be used if desired. Freely floating in the liquid in the enlarged portion 18 of the hydrometer is a glass bulb 30 adapted to contain air under ordinary conditions. This bulb is provided in order that the hydrometer may float in the electrolyte, and further in order to lighten the instrument sufficiently to permit of enough weight to be placed in the bottom of the hydrometer to maintain it in an upright position. The weight in the present case may be in the form of shot, mercury, or any other preferred means. The air bulb 30 is so proportioned with relation to the external dimensions of the enlarged portion 18 of the hydrometer that when a change in specific gravity occurs as a result of an increase in temperature, the level 29 of the liquid will rise substantially exactly the same distance as the hydrometer descends. The converse of this is also true with a decrease in temperature. Even assuming that the correct proportions between the travel of the liquid 29 and the hydrometer could be obtained without the aid of said bulb 30, said bulb or some equivalent provision could not be dispensed with except in determining the specific gravity of comparatively heavy liquids. In other words, the bulb 30 or some equivalent thereof has been found to be essential for the purposes above pointed out when the hydrometer is used in determining the specific gravity of liquids, such as for instance the electrolyte of a storage cell.

Among the advantages of the hydrometer construction above described, are, first, the column of ether, alcohol, or whatever other liquid may be used to compensate for temperature changes may be sufficiently large to enable a reading thereof to be taken quickly and easily, especially when said liquid is deeply colored, as is preferred, and, second, in view of the fact that there is no scale contained within the hydrometer as has heretofore been commonly the case, the hydrometer may readily be constructed of round glass without encountering the difficulty of having the scale turn to the opposite side of the instrument while a reading is being taken. Accordingly, a comparatively inexpensive hydrometer is provided as compared with the hydrometers of more or less special design as now commonly constructed.

In the use of the present hydrometer, it is preferred to mount the scale to be read in conjunction therewith exterior thereof and to calibrate the same in such manner that the line of graduation thereon, which corresponds with the level of the liquid within the hydrometer, will indicate the specific gravity of the electrolyte in which the hydrometer is floating. With this in view, a scale 31 is provided adjacent the portion of the tube 20 of the hydrometer which extends above the cover 14, said scale 31 being preferably cast integral with the protecting tube 23, as is shown more clearly in Fig. 1 of the drawings. The scale may be graduated in any preferred manner to indicate specific gravity. In view of the fact that the scale 31 is cast integral with the tube 23 and extends outwardly to one side thereof, substantially as shown in Fig. 1 of the drawings, it is necessary to provide the clamping nut 27 with a suitable slot 32 in order that said nut may be passed down over the tube 23 into engagement with the screw-threaded opening 28 of the cover for the purpose of clamping said tube 23 securely in position, as hereinbefore described.

In constructing the hydrometer, the top of the tube 20 thereof is preferably left open, so that the proper amount of liquid and weight may be placed in the same while it is floating in a liquid of known specific gravity at a known temperature, thus rendering proportionment and the calibration of the scale a comparatively easy matter. The tube 20 is then sealed after which a reading of the level of the liquid within the hydrometer against the scale 31 will accurately indicate substantially the exact condition of charge of the battery without any subsequent corrections for temperature changes being necessitated. In other words, the present hydrometer automatically corrects its own readings for all temperature changes. This result is attained in the following manner: When the temperature rises, the electrolyte 12 within the cell expands, thus causing the hydrometer to sink deeper into the liquid. At the same time, however, the liquid in the hydrometer will also expand due to the rise in temperature, said hydrometer being so constructed that this expansion of the liquid within the same will cause the level 29 thereof to rise substantially exactly the same distance that the hydrometer has sunk into the electrolyte. In this manner the reading of the hydrometer is maintained substantially constant irrespective of the increase in temperature. On the other hand, if the temperature decreases, the hydrometer will be raised in the electrolyte, whereas the level 29 of the liquid within the hydrometer will fall substantially the same distance and thus maintain the reading of the hydrometer substantially constant for decreases in temperature also. Accordingly, the reading of the hydrometer is only affected by changes in specific gravity due to increased or decreased concentration of the electrolyte, such as results from a change in the condition of charge of the battery, its readings being unaffected by changes in specific gravity resulting merely from changes in temperature.

It is well known that during the use of a storage battery water is gassed off or evaporated out of the storage cells, thus increasing the concentration of the remaining electrolyte and also lowering the normal level of the electrolyte within the cells. This tends to give a hydrometer reading which is higher than that which would be obtained if the electrolyte was at its normal level because the rise due to increased concentration is greater than the drop due to the fall of the level. However, this fall in the level of the electrolyte which results from gassing or evaporation does lower the hydrometer sufficiently to compensate in a measure for the rise occasioned by the increased density of the electrolyte. The enlarged portion 18 of the hydrometer might be so proportioned with relation to the elongated tube 20 thereof that this latter action would completely compensate for the former, thus making the hydrometer read the same regardless of the level of the electrolyte with relation to the scale 31 or with relation to its normal level. However, if the portion 18 of the hydrometer were so proportioned with respect to the tube 20, it would have a very short range of movement for a change in specific gravity resulting from a change in the condition of charge or discharge of the cell.

Accordingly, in order to provide an arrangement which will not only compensate for temperature changes but also for variations in the level of the electrolyte, and at the same time provide a hydrometer which will have a comparatively long range of movement for variations in specific gravity resulting from changes in the condition of charge or discharge of the battery, the construction illustrated in Fig. 4 of the drawings has been designed. Referring more in detail to this figure, the scale 31 is pivotally supported as at 33 to the end of an oscillating lever 34, said lever being preferably pivoted as at 35 to suitable lugs 36, which depend from the cover 14, substantially as shown. The free end of the lever 34 is operatively attached to a float 37 designed to float in the electrolyte as shown. From this it will be noted that any rise or fall in the level of the electrolyte will cause a corresponding rise or fall of the float 37, the movements of which will be transmitted by means of the pivoted lever 34 to the scale 31, a fall of said float acting to cause the scale to rise, and vice versa. It will be readily observed that by varying the position of the pivotal point 35 of the lever 34 with relation to the float 37 and the scale 31, any desired motion of the scale may be secured with a given change in the level of the electrolyte. From the above, it will be observed that through proper proportioning the hydrometer reading will not be affected by changes in the level of the electrolyte. Hence, in this modification of the invention an arrangement is provided whereby the hydrometer readings will indicate very accurately the condition of charge or discharge of the storage battery, the construction illustrated in said modification being designed to compensate for variations in the level of the electrolyte, whereas the hydrometer used in connection therewith, being the same as the one described in connection with the preferred embodiment of the invention, automatically compensates for changes in temperature. The possibility of discrepancies entering into the hydrometer readings is, therefore, reduced to a minimum. As will be readily appreciated, the movable scale feature, illustrated in Fig. 4 of the drawings, may be dispensed with if extreme accuracy in the readings is not essential. In other words, the arrangement shown in the preferred embodiment of the invention has been found more practical for ordinary purposes.

While thus far the hydrometer which forms the subject matter of the present invention has been described as adapted primarily for use in connection with the storage batteries, it is, of course, obvious that the same is of much broader adaptation and in fact may be used for measuring the specific gravity of any liquid regardless of whether or not such liquid is an electrolyte. In other words, it is to be expressly understood that it is not herein intended to limit or in any manner restrict the use of the present improvements to storage batteries.

Figure 6:
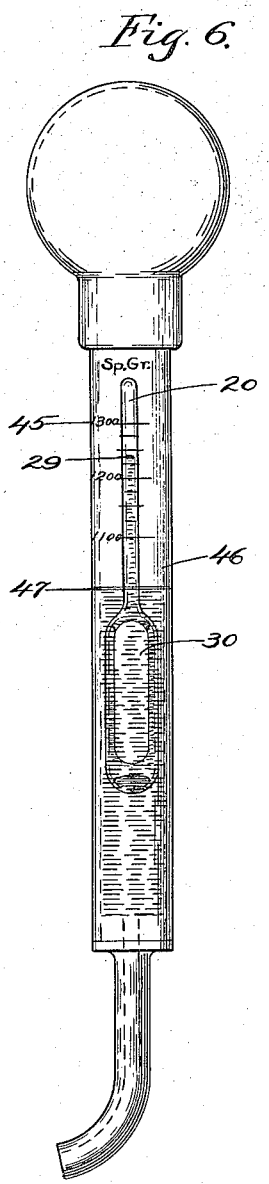
Figs. 5 and 6 are views illustrating further embodiments of the invention.
Figure 5:
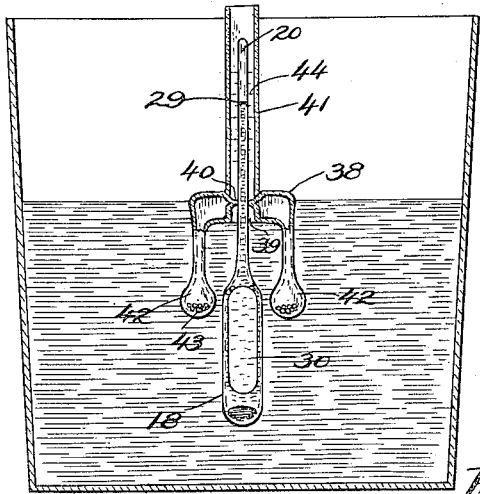

In Figs. 5 and 6 two methods of adapting the hydrometer for use in measuring the specific gravity of any liquid are illustrated. By referring to these figures it will be apparent that no change in the hydrometer per se is necessitated in order to effect this broader adaptation. In other words, all that is necessary is the provision of a portable scale, as a separate unit as in Fig. 5, for instance, or if desired, a scale may be etched or otherwise formed directly in or on the wall of the vessel containing the liquid the specific gravity of which is to be measured, as in Fig. 6, for example.

In Fig. 5 one form of scale designed for adapting the hydrometer for use in measuring the specific gravity of liquids of various kinds is illustrated, this form being constructed for use in cases where the vessel containing the liquid is of such size and shape as will permit of the scale and hydrometer being placed therein in such manner that a reading may be conveniently made. With this in view, the scale comprises a float 38 provided with a central opening 39 through which the upper portion 20 of the hydrometer may extend substantially as shown, the walls of said opening being provided with a plurality of inwardly projecting lugs 40 similar to the lugs 24 shown and described in connection with the embodiment of the invention illustrated in Figs. 1 and 2, said lugs being for the purpose of maintaining the tube 20 of the hydrometer centrally disposed within said opening during its movements relative to the float. Carried by and extending upwardly from the float 38 is a tubular member 41 designed to surround the hydrometer 2, said member being of sufficient height to project slightly above the upper end of the hydrometer at all times. This tube 41 may be attached in any suitable manner to the upper surface of the float adjacent the edge of the opening 39 or it may be formed integral with the float, as desired.

Depending from the float are a plurality of hollow sack-like members 42 designed to contain shot 43 or other suitable weight. In this manner the float and tubular member are maintained in an upright position, all tendencies of the device to lean or tip over being overcome. It is preferred to construct the float and its associated parts of glass so that the specific gravity of acids and other strong solutions may be measured without injury to the device. However, any other suitable material may be employed if desired. When the device is made of glass it has been found convenient to etch the specific gravity calibrations around the outer surface of the tube 41, substantially as shown at 44, in which event the level 29 of the temperature responsive medium within the hydrometer may be conveniently and quickly read in conjunction with said calibrations substantially as set out in connection with the embodiments of the invention hereinbefore described.

In Fig. 6 the invention is shown in the form of what is commonly termed a syringe hydrometer, the syringe portion of this embodiment being substantially similar to those now in common use, the only practical difference residing in the provision of a scale 45 preferably etched around the outer surface of the cylindrical container 46 thereof and the further provision of a normal level mark 47 to which mark the level of the liquid being measured should correspond before a reading is taken. In other words, the scale is so calibrated that a reading of the level 29 of the liquid within the hydrometer in conjunction with said scale 45 will accurately indicate the specific gravity of the liquid being measured providing the level of said liquid corresponds substantially to the normal level mark 47.

It is believed that it will be apparent from the above that the present improvements are not limited to storage battery hydrometers but that on the other hand a temperature compensating hydrometer has been designed which is broadly adapted for specific gravity measurements of all kinds.

It is also obvious that various changes and modifications may be made in the construction and arrangement of parts herein illustrated and described, and it is not, therefore, desired to limit the invention to the particular embodiments shown except where limitations appear in the appended claims.

What I claim is:—

1. The combination with a storage cell, of a cover therefor having an opening therein adapted to receive a guide, a hydrometer adapted to float in the liquid of said cell and to project upwardly through said guide, a scale carried by said guide adjacent said hydrometer, and an indicator carried by said hydrometer and adapted to be read against said scale to indicate the specific gravity of said liquid.

2. The combination with a liquid container, of a scale carried thereby, and a hydrometer adapted to float in the liquid of said container and being provided with a temperature responsive indicator controlled to raise upon increase in temperature and lower upon decrease of temperature of the cell liquid, said indicator adapted to be read against said scale for the purpose of indicating the specific gravity of said liquid.

3. The combination with a storage cell, of a cover therefor having an opening therein adapted to receive a guide, a hydrometer adapted to float in the liquid of said cell and to project upwardly through said guide, means for maintaining said hydrometer centrally disposed in said guide and out of contact with the walls thereof, a scale carried by said guide adjacent said hydrometer, and a movable indicator carried by said hydrometer and adapted to be read against said scale to indicate the specific gravity of said liquid.

4. A hydrometer of the type described, comprising an enlarged lower portion, an elongated tubular portion extending therefrom and communicating therewith, a temperature responsive liquid in said lower portion and extending into said tubular portion, and an air bulb freely floating in the liquid in said lower portion, the dimensions of said bulb being so proportioned with relation to the dimensions of said lower and tubular portions of the hydrometer that a change in temperature will cause the level of said liquid to rise or fall in said tubular portion a distance substantially equal to the rise or fall of the hydrometer in the liquid being measured.

5. A hydrometer comprising a temperature responsive indicator adapted to be read against an adjacent scale, said hydrometer being so designed that the reading of said indicator in conjunction with said scale is not affected by specific gravity changes caused by variations in temperature.

6. The combination with a storage cell, of a hydrometer adapted to float in the liquid in said cell, a fixed scale adjacent the hydrometer, and a temperature responsive indicator carried by said hydrometer and controlled to raise upon increase in temperature and lower upon decrease in temperature of the cell liquid, said indicator adapted to be read against said scale to indicate the specific gravity of the liquid.

In testimony whereof, I have subscribed my name.

EDWARD F. ANDREWS.